PULSE GENERATOR

Filed Feb. 3, 1955

*INVENTOR.*
ARNOLD E. RESNIK
*BY*
ATTORNEYS

United States Patent Office 2,826,693
Patented Mar. 11, 1958

2,826,693

PULSE GENERATOR

Arnold E. Resnik, Ontario, Calif., assignor to the United States of America as represented by the Secretary of the Navy Application February 3, 1955, Serial No. 486,042

2 Claims. (Cl. 250—36)

Figure 1:
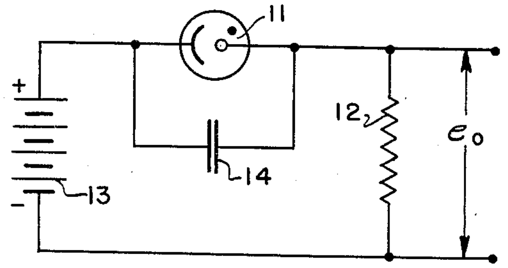

(Granted under Title 35, U. S. Code (1952), sec. 266)

The invention described herein may be manufactured and used by or for the Government of the United States of America for governmental purposes without the payment of any royalties thereon or therefor.

This invention relates to pulse generator circuits including a glow discharge tube and wherein an output of short duration pulses may be obtained and both the pulse shape and/or width and the repetition rate may be varied.

Glow tube relaxation oscillators have been well known and have had some use for many years to produce a saw-tooth wave form. However, this type of circuit has not been commonly used in pulse circuitry, since the width and shape of the pulse could not be varied independently of the repetition rate and this type of device is inherently a high impedance device which is adapated only to use with a restricted type of load and its stability is dependent on the nature of the load.

Many other types of circuits have been utilized for producing pulses of various shapes, duration and repetition rates, such as blocking oscillators, multivibrators, phanastrons, and similar devices, but these were high in cost, large in size, and required an excessive number of parts.

The present invention consists essentially of a pulse generator circuit having one or more glow discharge tubes connected in series with one or more resistance elements to a direct current source of voltage and with one or more capacitance elements operatively associated with the circuit in an alternately charging and discharging relation. In all of the four forms of the present invention the pulse is taken off across one of the resistance elements and in three forms two resistance elements are utilized to permit independent variation of the pulse width and repetition rate. By proper selection of values in the most suitable circuit of the present invention almost any desired pulse shape, width and repetition rate may be obtained.

One object of the present invention is to provide a pulse generator having a minimum number of parts and which is small in size and inexpensive to construct.

Another object of the present invention is to provide pulse generator circuitry wherein the pulse width and repetition rate may be independently varied.

A still further object of the present invention is to provide an improvement in the glow discharge tube type of pulse generator circuit whereby different pulse shapes and widths and repetition rates may be obtained by variations in values and arrangements of the glow tubes, resistances and capacitances in the circuit.

Still another object of the present invention is to provide an improved type of pulse generator circuit which may be used with loads of both high and low impedance and whose stability is not dependent on the nature of the load.

Other objects and many of the attendant advantages of this invention will be readily appreciated as the same becomes better understood by reference to the following detailed description when considered in connection with the accompanying drawings wherein:

Fig. 1 is a schematic circuit diagram of one form of the present invention providing a different pulse shape than the conventional glow tube relaxation oscillator but wherein the pulse width and repetition rate are dependent.

Figure 1A:
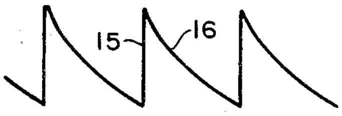

Fig. 1*a* illustrates the pulse output of a typical circuit as illustrated in Fig. 1.

Figure 2:
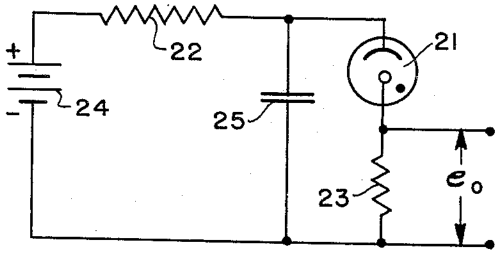

Fig. 2 is a schematic circuit diagram of another form of the present invention wherein the pulse width and repetition rate are independently variable.

Figure 2A:
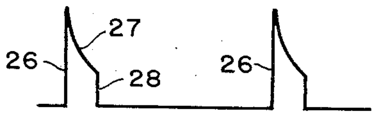

Fig. 2*a* illustrates the typical pulse output from the circuit of Fig. 2.

Figure 3:
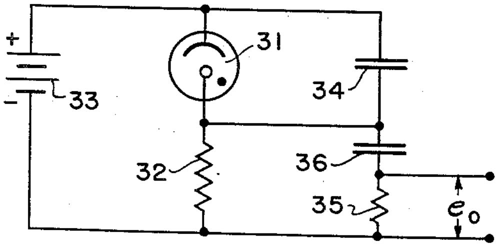

Fig. 3 is a still another form of the present invention illustrating a second embodiment wherein the pulse width and repetition rate are independently variable, but having a different pulse shape than that illustrated in Fig. 2*a*.

Figure 3A:
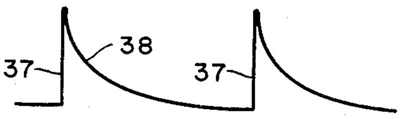

Fig. 3*a* illustrates a typical pulse output from the circuit of Fig. 3.

Figure 4:
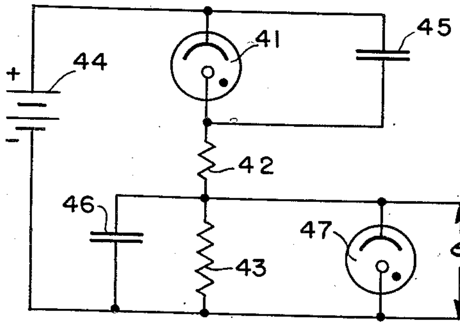
Figure 4A:
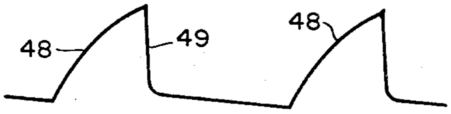

Fig. 4 illustrates a preferred embodiment of the present invention wherein the pulse shape and width may be varied independently of the repetition rate, and Fig. 4*a* illustrates a typical pulse output of the circuit shown in Fig. 4.

Referring now to the drawings in detail, a relatively simple form of pulse generator circuit is illustrated in Fig. 1 consisting of a glow tube 11 in series with a resistance 12 and a source of D. C. voltage such as the battery 13. A condenser 14 is connected across the glow tube 11 in alternately charging and discharging relation to produce a series of pulses having a wave form illustrated in Fig. 1*a* and wherein the pulse width is dependent on the repetition rate or conversely the repetition rate is dependent on the pulse width which in turn is determined by the values of the voltage available from the D. C. source 13, the voltage at which the glow discharge tube 11 breaks down and conducts and the voltage at which it cuts off or ceases to conduct. The pulse width and interval will be dependent primarily on the values of the resistance 12 and capacitance 14.

It will be noted that the wave form shown in Fig. 1*a* has the very steep, substantially vertical leading edge 15 due to the rapid discharge of condenser 14 when the glow tube 11 reaches the breakdown potential and conducts. When the glow discharge tube 11 has discharged the condenser 14 to the point where the voltage across the tube is less than the cutoff potential, the tube ceases to conduct and the full voltage of the D. C. source 13 is across the resistor 12 and the output voltage $e_0$ reaches a maximum almost instantanously. As the condenser 14 charges through the resistor 12 the current decreases exponentially and the voltage drop across the resistance 12 decreases as the condenser 14 charges producing the trailing edge of the wave 16.

Another circuit constructed in accordance with the present invention is illustrated in Fig. 2 wherein the glow discharge tube 21 is in series with a resistance 22, a resistance 23 and a direct current source of voltage such as the battery 24. A condenser 25 is connected in parallel across the tube 21 and resistance 23 with the output voltage being taken off across the resistance 23 to produce the waveform illustrated in Fig. 2*a*.

In the circuit of Fig. 2 the output voltage $e_0$ will be zero during the time the condenser 25 is charging through the resistance 22. When the breakdown potential of tube 21 is reached the condenser 25 will discharge through the tube 21 and resistance 23 producing a pulse having a very steep, almost vertical leading edge 26 of large amplitude. The tailing edge of the pulse 27 will have a very short duration lasting only a few microseconds depending on the value of the resistance 23 and the value of the condenser 25. When the cutoff potential of the tube 21 is reached a very steep almost vertical trailing edge 28 is provided since the voltage across the resistance 23 will drop to zero almost instantaneously. The interval between the trailing edge 28 and the succeeding leading edge 26 is determined by the time required to charge condenser 25 through resistance 22 to the breakdown potential of tube 21. It will be apparent that by the proper choice of values the slope of the curve 27 and the width of the pulse can be readily varied and the repetition rate and the time interval between pulses can be readily determined and varied by the choice of resistance 22 and condenser 25. If resistance 22 is much greater than resistance 23 the pulse will be of very short duration compared to the interval between pulses and with this relationship between the resistances 22 and 23 the external circuit has a negligible effect on the discharge cycle.

Referring now to Fig. 3 a still further modification is illustrated wherein the glow discharge tube 31 is connected in series with a resistance 32 to a source of direct current voltage such as the battery 33. A condenser 34 is connected across the glow tube 31 in alternately charging and discharging relation thereto. A second resistance 35 and a second condenser 36 are connected in series across the resistance 32, the output $e_0$ being taken off across the resistance 35 to produce a waveform such as that illustrated in Fig. 3*a*. In the circuit shown in Fig. 3 the full voltage of the D. C. source 33 will appear instantaneously across the resistance 35 thus producing a steep leading edge 37 on the pulse. Condenser 36 will charge through the resistance 35 producing the exponential curve 38 due to the decay of the voltage across resistance 35. The condenser 34 at the same time is charging through the resistance 32 so that the voltage $e_0$ will drop off to the value of the voltage drop across resistance 32 and then follow the voltage decay across resistance 32 until condenser 34 has charged to a voltage equal to the breakdown potential of the tube 31. When tube 31 starts conducting condenser 34 will discharge almost instantanously until the cutoff voltage of tube 31 is reached when the cycle will be repeated. It will be apparent that the value of condenser 36 and resistance 35 will determine the time duration of the pulse and the slope of the exponential curve 38 and the values of condenser 34 and resistance 32 will determine the interval between successive leading edges 37 and the repetition rate of the pulses. It is obvious that these two factors can be independently varied and that the values of condenser 36 and resistance 35 will normally be very small in relation to the values of resistance 32 and condenser 34 to provide a relatively short duration pulse of a few microseconds compared to the interval between pulses. The slope of the curve 38 can obviously be made very steep and of short duration if so desired.

In the pulse generator circuit illustrated in Fig. 4 one glow discharge tube 41 is connected in series with two resistances 42 and 43 to a source of direct current voltage such as the battery 44. A condenser 45 is connected across the tube 41 in alternately charge and discharging relation thereto and a second condenser 46 is connected across the resistance 43. A second glow discharge tube 47 is also connected across the resistance 43 and the output $e_0$ is taken off across the resistance 43 to provide a waveform such as that illustrated in Fig. 4*a*.

This particular circuit arrangement is particularly suitable for certain applications which call for rise and fall times which are settable over a wide range of possible values and where the repetition rate may be independently varied. For example, a pulse for charging an inductance might require characteristics of the waveform illustrated in Fig. 4*a*. Here the pulse exhibits a relatively slow rise and a rapid fall.

In this circuit condenser 45 will charge through resistances 43 and 42 and normally this would cause a rise of voltage across resistance 43 almost instantaneously to a value approaching the supply voltage from the direct current source 44. But with the present circuit this will be presented by the charging of condenser 46 which is very small compared to condenser 45. This will provide the slow rise on the leading edge 48 to a value where the voltage reaches the breakdown potential of glow tube 47 when the condenser 46 will instantaneously discharge through the tube providing a very rapid fall into the voltage and the very sharp trailing edge 49. The voltage will then drop to a value determined by the concurrent charging of condenser 45 which at this point will be partially charged but the voltage across resistance 43 will normally be above the cutoff voltage of tube 47, and tube 47 will continue to conduct while the condenser 45 is charging to a voltage sufficient to cause breakdown and conduction of the tube 41. When tube 41 conducts condenser 45 will be discharged almost instantaneously and the cycle will be repeated. It will be apparent that the exponential curve of the leading edge 48 may be varied as desired by the choice of values of condenser 46 and resistance 43 and the exponental decay curve of the trailing edge 49 will be determined by the relation between the condenser 46 and the conducting resistance of tube 47.

In the circuit shown in Fig. 4 for producing the pulse of Fig. 4*a* the condenser 46 will be very small compared to condenser 45 and resistance 43 will usually be greater than resistance 42. The repetition rate of the pulses or the time interval between pulses will be determined by the value of condenser 45 in relation to the resistors 42 and 43 through which it charges.

In all of the circuits illustrated in Figs. 1 through 4 the output voltage $e_0$ is taken off across a resistance which is in series with a glow discharge type of tube and in the modifications illustrated in Figs. 2 to 4 the pulse shape and the pulse width may be varied independently of the repetition rate.

By the proper choice of the circuits shown and the values of the various elements in the circuit substantially any pulse shape, pulse width and repetition rate may be obtained. It will also be apparent to those skilled in the art that the pulse outputs may be modified by well known circuitry to provide different pulses which are not immediately available from the circuits shown in the present application. For instance, the pulse output of the circuit illustrated in Fig. 2 and shown in Fig. 2*a* could be clipped to provide a square wave or a series of square pulses at any desired interval. Various other waveforms may be obtained by using these pulses to trigger and cut off subsequent circuits.

Obviously many modifications and variations of the present invention are possible in the light of the above teachings. It is therefore to be understood that within the scope of the appended claims the invention may be practiced otherwise than as specifically described.

What is claimed is:

1. A pulse generator circuit comprising a source of direct current, a glow discharge tube having one terminal connected to said source, a resistance in series with said tube and having one end connected to the other terminal of said tube, a condenser connected in parallel across the terminals of said tube, a second resistance in series with said first resistance and tube and connected to the other end of said first resistance at a first junction point and to said source at a second junction point, a second condenser in parallel with said second resistance and connected across said junction points, and a second glow discharge tube in parallel with said second resistance and said second condenser and connected across said junction points.

2. A pulse generator as set forth in claim 1 wherein the capacitance of said first condenser is substantially greater than said second condenser, and the resistance of said second resistance is greater than said first resistance.

References Cited in the file of this patent

UNITED STATES PATENTS

| | | |
|---|---|---|
| 1,876,109 | Van der Pol | Sept. 6, 1932 |
| 2,054,882 | Schlesinger | Sept. 22, 1936 |
| 2,140,840 | Langer et al. | Dec. 20, 1938 |
| 2,263,986 | Finch | Nov. 25, 1941 |
| 2,437,892 | Rambo | Mar. 16, 1948 |
| 2,646,542 | Robinson | July 21, 1953 |

FOREIGN PATENTS

| | | |
|---|---|---|
| 313,143 | Great Britain | May 16, 1930 |
| 383,286 | Great Britain | Oct. 31, 1932 |